United States Patent Office 3,093,657
Patented June 11, 1963

3,093,657
PROCESS OF PREPARING NITRO-3-HYDROXY-THIOPHENE-2-CARBOXYLIC ACID ESTERS
Manfred Schorr, Frankfurt am Main, and Hans Fiesselmann, Erlangen, Germany, assignors to Farbwerke Hoechst Aktiengesellschaft vormals Meister Lucius & Brüning, Frankfurt am Main, Germany, a corporation of Germany
No Drawing. Filed Jan. 12, 1961, Ser. No. 82,165
Claims priority, application Germany Jan. 14, 1960
9 Claims. (Cl. 260—332.2)

The present invention relates to a process of preparing nitro-3-hydroxy-thiophene-2-carboxylic acid esters.

It is known that thiophene and its derivatives are not resistant to strong oxidizing agents, for instance, nitric acid, but are decomposed to a large extent. Therefore, the nitration of thiophene derivatives was carried out under mild conditions, for instance by treatment with acetyl nitrate in glacial acetic acid. When applying these protective methods for the nitration of 3-hydroxy-thiophene-2-carboxylic acid esters it was not possible to obtain the nitro derivatives in a quantity worth mentioning.

Now we have surprisingly found that nitro-3-hydroxy-thiophene-2-carboxylic acid esters of the general formula

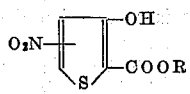

in which R is an aliphatic radical containing from 1 to 6 carbon atoms can be prepared by causing molar quantities of concentrated nitric acid to act on 3-hydroxy-thiophene-2-carboxylic acid esters dissolved in concentrated sulfuric acid and corresponding to the formula

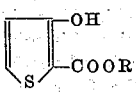

in which R has the meaning given above. If necessary, the isomers obtained can be separated from one another for instance by steam distillation, fractional crystallization or by chromatography.

As starting material for the process of the invention there can be used the esters with aliphatic alcohols, particularly those containing from 1 to 6 carbon atoms. These esters can be obtained in a simple manner, for instance as described in German Patent 1,020,641 by ring closure from easily accessible aliphatic starting substances, i.e. from $\alpha,\beta$-dihalogeno-carboxylic acid esters and thioglycolic acid esters. The higher esters can likewise be prepared by reesterification from the lower esters. For this purpose, the methyl ester, for instance, is introduced into an excess amount of the corresponding higher alcohol in which, previously, a little more than 1 mol of sodium had been dissolved, the mixture is heated to boiling for several hours and the liberated methyl alcohol is distilled off over a column.

The nitration of the 3-hydroxy-thiophene-2-carboxylic acid esters can advantageously be carried out by dissolving them in concentrated sulfuric acid and adding about the calculated amount of concentrated nitric acid. It is of advantage to carry out the nitration in such a way that the esters are dissolved in concentrated sulfuric acid and that a mixture of fuming nitric acid and concentrated sulfuric acid is caused to act on them, since the addition of the nitrating acid in view of the higher volume can be regulated more easily. When operating in this way, weakly lowered temperatures are applied, for instance from $-15°$ C. to $+10°$ C. In some cases, particularly when nitrating the higher esters, it is of advantage to eliminate the cooling bath when the addition of the mixture is terminated and to stir for a further time at room temperature or at a moderately elevated temperature, for instance at 30–60° C. The reaction mixture is then decomposed by means of ice and the crude nitration product that has been separated off is filtered off with suction or taken up in an appropriate solvent, for instance methylene chloride.

When nitrating the 3-hydroxy-thiophene-2-carboxylic acid esters, there are formed, in addition to the 4-nitro compounds, likewise small amounts of derivatives nitrated in 5-position. The separation of the two isomers is carried out according to the physical properties of the substances. In the case of the methyl and ethyl esters it can be attained by fractional crystallization from petroleum ether. It is still more advantageous to treat the crude product by steam distillation. Whereas 4-nitro-3-hydroxy-thiophene-2-carboxylic acid methyl ester is easily volatile with steam, the isomeric 5-nitro derivative remains in the distillation residue and can be isolated therefrom. As regards the esters of high-molecular weight, the compounds nitrated in 5-position are to a small extent likewise volatile with steam so that the 4-nitro-3-hydroxy-thiophene-2-carboxylic acid esters thus isolated still contain small amounts of the corresponding 5-nitro compounds. If these nitration products are solid, the completely pure compound can be obtained by fractional crystallization; in the case of liquid nitro esters the separation may be carried out by chromatography. The yields in nitrated esters are within the same range as those obtained when nitrating phenol under similar conditions.

Furtheremore, it is surprising that the 4-nitro compounds and not the isomeric 5-nitro compounds form the main products of the reaction, whereas, in general, the substitution of the 5-position of the thiophene ring is preferred.

The 4-nitro-3-hydroxy-thiophene-2-carboxylic acid esters form intensely yellow crystals or are yellow liquids that cannot be distilled. The derivatives nitrated in 5-position, as far as they crystallize, show only a weakly yellow coloration. Upon heating to elevated temperatures they often decompose with deflagration. When dissolved in alkalies, they show a deep red-orange tint. With iron (III)-chloride the 4-nitro compounds react while showing a brown coloration, whereas the isomeric 5-nitro derivatives and the 3-hydroxy-thiophene-carboxylic acid esters used as starting products show a violet coloration when being reacted.

The purity of the products can be examined by means of the paper chromatography. With benzine (boiling point 60–95° C.) as movable phase the non-nitrated esters practically are concurrent with the front of the solvent, closely followed by the 4-nitro compounds, whereas the 5-nitro derivatives migrate more slowly and form very indistinct zones. The substances can be made visible on paper by spraying with an iron (III) chloride solution.

The compounds prepared according to the invention possess valuable biological properties. In particular, the 4-nitro compounds are distinguished by an excellent fungistatic and fungicidal action on a great number of fungi and yeasts pathogenic and apathogenic to humans, animals and vegetables. In this respect it must be particularly stated that this activity is only slightly reduced by the presence of serum. In the following table there are indicated for instance, the lowest effective concentrations of 4-nitro-3-hydroxy-thiophene-2-carboxylic acid methyl ester which provoke fungistatic action on some germs in the absence or presence of serum:

LOWEST EFFECTIVE CONCENTRATION CAUSING FUNGISTATIC ACTIVITY IN γ/CC.

| | Without serum | With serum (20%) |
|---|---|---|
| Microsporon gypseum | 8 | 16 |
| Microsporon lanosum | 8 | 16 |
| Epidermophyton rubrum | 8 | 31 |
| Trichophyton plicatile | 4 | 31 |
| Candida albicans Y 1200 | 31 | 125 |
| Alternaria spec | 31 | 62 |
| Fusarium solani | 31 | 62 |
| Aspergillus niger | 62 | 125 |
| Trichoderma viride | 62 | 125 |

The products obtained according to the process of the present invention are furthermore distinguished by a very low toxicity. For instance, the maximum tolerated dose (D.T.M.) of the 4-nitro-3-hydroxy-thiophene-2-carboxylic acid methyl ester in mice, subcutaneously applied, amounts to 10.4 milligrams/20 grams of mouse, with oral administration to 12.5 milligrams/20 grams of mouse, whereas the D.T.M. of the isomeric 5-nitro compound subcutaneously applied amounts to 6.25 milligrams/20 grams of mouse, and, orally applied, to 12.5 milligrams/20 grams of mouse. The products obtained according to the present invention are likewise excellently tolerated by the skin.

The above-mentioned properties render the products appropriate as medicaments for the treatment of human and animal diseases caused by fungi. They can likewise be applied in agriculture for avoiding and combating plant diseases caused by fungi. Furthermore, they can be applied in all cases where organic materials such as cellulose, tissues, paper, leather, wood and the like are to be protected against infestment or destruction by fungi.

Even when using the mixture of isomers as medicament, it is not necessary to separate it, since the more active 4-isomers always form the major part of the mixture and the toxicity and the tolerability are practically not influenced by the 5-isomer. In special cases, however, this separation can be carried out without difficulties in the above-described manner.

The following examples serve to illustrate the invention but they are not intended to limit it thereto.

EXAMPLE 1

*4-Nitro-3-Hydroxy-Thiophene-2-Carboxylic Acid Methyl Ester*

196 grams of 3-hydroxy-thiophene-2-carboxylic acid methyl ester are introduced at a temperature of −10 to 0° C. into 620 cc. of concentrated sulfuric acid and, after all parts have been dissolved, a mixture of 56 cc. of fuming nitric acid (D=1.52) and 310 cc. of concentrated sulfuric acid is added at the same temperature. After the addition is terminated stirring is continued for 1 further hour, the temperature not being allowed to exceed 0°. The reaction mixture is then poured on ice. A smeary product separates off which solidifies after standing for a short time. It is filtered off with suction, washed with a little water and, without preliminary drying, subjected to steam distillation. When operating in this way, the ester nitrated in 4-position passes over and precipitates in the receiver in the form of yellow needles. Before filtering with suction the distillate is favorably weakly acidified. After drying at the air there are obtained 68 grams of 4-nitro-3-hydroxy-thiophene-2-carboxylic acid methyl ester showing a melting point of 88–89° C. and being free of the isomeric 5-nitro compound. For further purification the substance can be recrystallized from about 1 liter of benzine (boiling point 60–95° C.). On cooling of the hot solution the substance at first separates off in the form of finely felted needles which on standing with the mother liquor are transformed within several hours into compact coarse needles showing a brilliant yellow coloration and which melt at 89–90° C.

From the residue of the steam distillation there are precipitated on cooling, in addition to resinous products, crystals of the 5-nitro-3-hydroxy-thiophene-2-carboxylic acid ester. After filtering with suction and drying there are obtained 43 grams of a dark crude product which may be recrystallized from about 1 liter of cyclohexane with addition of charcoal. Thereby 14 grams of the compound nitrated in 5-position are obtained in the form of fallow yellow felted needles melting at 110–111° C.

The two isomeric compounds may likewise be separated by recrystallization from benzine (boiling point 60–95° C.). For this purpose the crude product obtained after decomposition of the reaction mixture by means of ice is dried at the air and boiled with 12 liters of benzine. After having filtered off some undissolved matter the product is cooled, whereby the 5-nitro compound crystallizes out. The filtrate is concentrated by evaporation and the residue is recrystallized from 500 cc. of petroleum ether. There are thus obtained 70 grams of 4-nitro-3-hydroxy-thiophene-2-carboxylic acid methyl ester (melting point 88–89° C.). The 5-nitro-3-hydroxy-thiophene-2-carboxylic acid methyl ester first filtered off with suction is again recrystallized from 2250 cc. of benzine. There are obtained 30 grams of the compound melting at 110–111° C.

EXAMPLE 2

69 grams of 3-hydroxy-thiophene-2-carboxylic acid ethyl ester are dissolved at −5° C. to 0° in 200 cc. of concentrated sulfuric acid and a mixture of 20 cc. of fuming nitric acid (D=1.52) and 40 cc. of concentrated sulfuric acid is added dropwise. After all parts have been introduced, cooling is removed and stirring is continued for 1 further hour at room temperature. The mixture is poured on ice, the product the larger part of which soon solidifies, is filtered off with suction, washed with a small amount of water and subjected to steam distillation. 24 grams of 4-nitro-3-hydroxy-thiophene-2-carboxylic acid ethyl ester separate out in the distillate which after weak acidification are filtered off with suction and melt at 83–86° C. By recrystallization from benzine (boiling point 60–95° C.) there are obtained 19 grams of yellow crystals melting at 89–91° C.

On cooling, 17 grams of a mixture of brown resin and crystals is separated off in the residue of the steam distillation. By recrystallizing this mixture from cyclohexane the 5-nitro-3-hydroxy-thiophene-2-carboxylic acid ethyl ester is obtained in the form of nearly colorless sticks melting at 98–100° C.

EXAMPLE 3

*4-Nitro-3-Hydroxy-Thiophene-2-Carboxylic Acid-n-Butyl Ester*

To a solution of 62 grams of 3-hydroxy-thiophene-2-carboxylic acid-n-butyl ester (colorless liquid, boiling point 130–132° C. under a pressure of 7 mm. of mercury) in 155 cc. of concentrated sulfuric acid there is added dropwise at −5° C. to 0° a mixture of 15.4 cc. of fuming nitric acid (D=1.52) and 78 cc. of concentrated sulfuric acid and the cooling bath is then removed. The temperature thereby rises. By slight cooling or heating the mixture is maintained for 1 hour at 40° C., it is then poured on ice and the dark oil is taken up with methylene-chloride. After separation of the organic layer it is washed once with water, dried over sodium sulfate and the solvent is cautiously eliminated by evaporation at 20–30° C. under reduced pressure. The residue is distilled with steam and the oil that has passed over is taken up with methylene-chloride after weak acidification of the distillate. If not all starting material has been consumed the latter is contained in the first proportions of the distillation. (Proof by paper chromatography.) Suitably these portions are rejected. The methylene-chloride solution is dried over sodium sulfate and then completely evaporated at 20–30° C. under reduced pressure. There remain behind 14 grams of 4-nitro-3-hydroxy-thiophene-2-carboxylic acid-n-butylester still containing 5-nitro-3-hydroxy-thiophene-2-carboxylic acid-n-butylester and constituting a yellow liquid.

EXAMPLE 4

4-Nitro-3-Hydroxy-Thiophene-2-Carboxylic Acid-n-Amylester 72 grams of 3-hydroxy-thiophene-2-carboxylic acid-n-amylester (weakly yellow liquid, boiling at 92-94° C. under a pressure of 0.7 mm. of mercury) are dissolved at −5° C. to 0° in 168 cc. of concentrated sulfuric acid and at the same temperature a mixture of 16.7 cc. of fuming nitric acid (D=1.52) and 84 cc. of concentrated sulfuric acid is dropwise added. The cooling bath is then removed. Spontaneous heating of the reaction mixture sets in. By occasional cooling or heating the temperature is still maintained for 1 hour at 40–50° C., and the reaction mixture is then poured on ice. The precipitated dark product is taken up with methylene-chloride and the solution obtained is evaporated at 20–30° C. under reduced pressure after one wash with water and drying over sodium sulfate. The residue is subjected to steam distillation and the oil that has passed over is taken up with methylene-chloride after weak acidification of the distillate. The solution is dried as described above and the solvent is completely distilled off under reduced pressure at 20-30° C. There remains behind a mixture of 14 grams of 4-nitro-3-hydroxy-thiophene-2-carboxylic acid-n-amylester and 5-nitro-3-hydroxy-thiophene-2-carboxylic acid-n-amylester in the form of a yellow liquid.

We claim:

1. A process of preparing nitro-3-hydroxy-thiophene-2-carboxylic acid esters of the formula

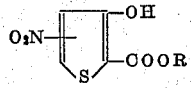

in which R is an alkyl of from 1 to 6 carbon atoms, which comprises reacting 3-hydroxy-thiophene-2-carboxylic acid esters dissolved in concentrated sulfuric acid and corresponding to the formula

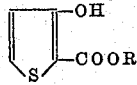

in which R has the meaning given above, with molar quantities of concentrated nitric acid.

2. A process as claimed in claim 1 which comprises reacting the concentrated nitric acid with 3-hydroxy-thiophene-2-carboxylic acid esters of the formula

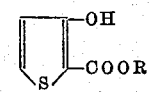

in which R represents an alkyl of from 1 to 6 carbon atoms at a temperature between −15° C. and +10° C.

3. A compound of the formula

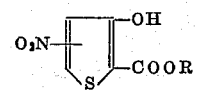

wherein R represents an alkyl of from 1 to 6 carbon atoms.

4. A mixture of 4-nitro-3-hydroxy-thiophene-2-carboxylic acid n-butyl-ester and 5-nitro-3-hydroxy-thiophene-2-carboxylic acid n-butyl ester.

5. A mixture of 4-nitro-3-hydroxy-thiophene-2-carboxylic acid n-amyl ester and 5-nitro-3-hydroxy-thiophene-2-carboxylic acid n-amyl ester.

6. 4-nitro-3-hydroxy-thiophene-2-carboxylic acid methyl ester.

7. 5-nitro-3-hydroxy-thiophene-2-carboxylic acid methyl ester.

8. 4-nitro-3-hydroxy-thiophene-2-carboxylic acid ethyl ester.

9. 5-nitro-3-hydroxy-thiophene-2-carboxylic acid ethyl ester.

References Cited in the file of this patent

UNITED STATES PATENTS

| | | |
|---|---|---|
| 2,497,145 | Terry et al. | Feb. 14, 1950 |
| 2,502,344 | Rosenberg et al. | Mar. 28, 1950 |

OTHER REFERENCES

Campaigne et al.: Jour. American Chem. Soc., volume 73, pages 3812–14 (1951).